United States Patent [19]

Kitahata et al.

[11] Patent Number: 4,965,905
[45] Date of Patent: Oct. 30, 1990

[54] APPARATUS FOR WAXING AND POLISHING

[75] Inventors: Roy S. Kitahata, Fullerton, Calif.; Kiyoshi Iha, Elk Grove Village, Ill.

[73] Assignee: The Chamberlain Group, Elmhurst, Ill.

[21] Appl. No.: 325,898

[22] Filed: Mar. 20, 1989

[51] Int. Cl.$^5$ .......................... B60S 3/06; A46B 13/00
[52] U.S. Cl. .......................................... 15/97.1; 15/98; 15/230.19
[58] Field of Search .................. 15/97 R, 98, 103, 230, 15/230.18, 230.19; 51/170 T, 170 MT

[56] References Cited

U.S. PATENT DOCUMENTS

| | | | |
|---|---|---|---|
| 1,689,166 | 10/1928 | Varner | 15/98 |
| 1,739,294 | 12/1929 | Despret | 15/230.19 |
| 2,280,149 | 4/1942 | Gerst | 15/230.18 X |
| 4,188,682 | 2/1980 | Burglin | 15/97 R |
| 4,791,694 | 12/1988 | Itaya et al. | 15/97 R |

FOREIGN PATENT DOCUMENTS

| | | | |
|---|---|---|---|
| 1154244 | 9/1963 | Fed. Rep. of Germany | 15/230 |
| 500762 | 11/1954 | Italy | 15/97 R |

Primary Examiner—Edward L. Roberts
Attorney, Agent, or Firm—Fitch, Even, Tabin & Flannery

[57] ABSTRACT

Apparatus for use in applying wax to an object and/or polishing the object. The apparatus includes a housing, an electric motor positioned within the housing and an operating shaft driven by the motor. A generally disk-shaped pad holder has a hub connected to the operating shaft with a holder having a first surface facing the housing and a second surface facing away from the housing. The apparatus further includes a pad of sponge-like material carried by the holder and positioned against the second surface of the holder. The apparatus also includes a bonnet of cloth material positioned about the pad and having an elastic band adjacent its periphery for holding the pad to retain the bonnet in its installed position. The pad holder includes an annular lip adjacent the periphery of the holder with the lip extending towards the housing and radially outwardly so that the bonnet can in its installed condition engages the lip to locate the bonnet and limit its inward movement.

9 Claims, 2 Drawing Sheets

APPARATUS FOR WAXING AND POLISHING

This invention relates to electrical apparatus for home use and, more specifically, to such apparatus for waxing and/or polishing an object, such as an automobile.

BACKGROUND OF THE INVENTION

Electrical waxer/polishers have gained widespread public acceptance because they relieve much tedious, redundant effort required in waxing and polishing an object, such as an automobile, by hand. Such electrical waxer/polishers typically include a hand-held housing enclosing a motor for driving an operating shaft either in generally rotational or orbital movement. A relatively rigid pad holder is attached to the shaft, with a sponge-like pad being carried by the holder. A cloth bonnet encompasses the pad for applying wax to the automobile. The first bonnet impregnated with wax is removed and a second cloth bonnet is installed to polish the surface to a high luster after the coating of wax has dried.

With use, these bonnets become frayed and unravel, resulting in loose threads. Due to the vibration and other forces resulting from the orbital or rotational movement, these loose threads can work their way over the top of the pad holder where the threads can become entwined with the operating shaft or other rotating components. This buildup of the threads wrapped around the shaft requires the operator to take the time consuming steps necessary to disassemble the components and cut or strip the threads from the shaft. If the accretion of threads is ignored, the performance of the waxer/polisher is reduced or, in an extreme case, the motor could burn out prematurely.

SUMMARY OF THE INVENTION

Among the several aspects and features of the present invention may be noted the provision of an improved waxer/polisher. The pad holder and the pad cooperate to preclude loose threads resulting from fraying of the bonnet from becoming entwined with the operating shaft. The pad holder and pad together form a trap for catching and holding such threads. The pad holder positively locates the cloth bonnet in position about the pad holder to resist its slipping relative to the holder as a result of frictional, centrifugal and/or vibrational forces. Additionally, the pad holder has increased rigidity so that the operator can apply more pressure to the surface to be polished without excessively deflecting or bending the pad holder. The waxer/polisher of the present invention has long service life, is reliable in use, and is relatively easy and economical to manufacture. Other aspects and features of the this invention will be, in part, apparent and, in part, pointed out specifically hereafter in the specification and accompanying drawings.

Briefly, one embodiment of a waxer and polisher including various aspects of the present invention comprises a housing, an electric motor positioned within the housing and an operating shaft driven by the motor. The waxer/polisher also includes a generally disk-shaped pad holder having a hub connected to the shaft with the holder having a first surface facing the housing and a second surface facing away from the housing. The holder includes an annular peripheral lip extending toward the housing and radially outwardly. A pad of sponge-like material is adhered to the lower surface of the pad holder, and a bonnet of cloth material encompasses the pad and is provided with an elastic band adjacent its periphery for holding the pad in its installed position. The band engages the lip of the holder to locate the bonnet and limit its shifting during operation of the waxer and polisher.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
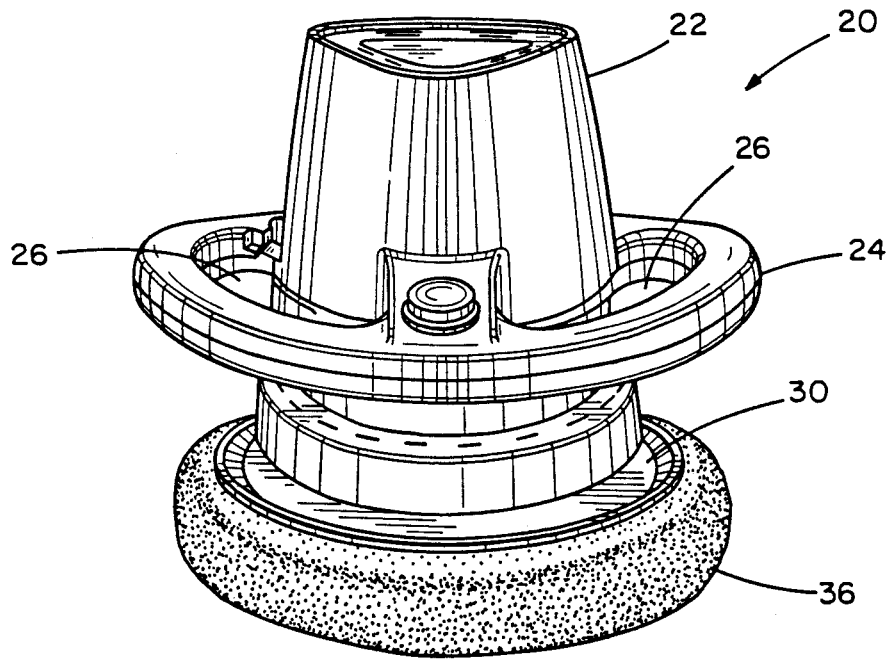
FIG. 1 is a perspective view of a waxer and polisher embodying various features of the present invention.

Referring now to the drawings, apparatus for use in applying wax to an object, such as an automobile, and/or polishing the waxed object is generally indicated by reference numeral 20. The washer/polisher 20 includes a plastic housing 22 with a peripheral rim 24 having spaced openings 26 for receiving the fingers of the user. An electric motor 25 is supported within the housing and has an operating shaft to which is connected a counterweight 27 having a roller bearing receiving the motor shaft. The counterweight has a threaded aperture for receiving a bolt 28 the head of which holds a pad holder 30. As the axis of the aperture is parallel to, but offset with respect to, the axis of the shaft bearing, rotation of the operating shaft results in orbital movement of the bolt 28. Because such a motor, operating shaft and counterweight are well known to those of skill in the art, they need not be further described here. For example, such components are employed in the Waxcoa Waxmaster 9 orbital polisher system (Waxmaster is a registered trademark of the Waxing Corporation of America of Orange, Calif.). While this invention is being described in the environment of an orbital waxer and polisher system, it will be appreciated that it is equally applicable to a waxer and polisher system in which the pad holder undergoes predominantly rotational movement.

Figure 2:
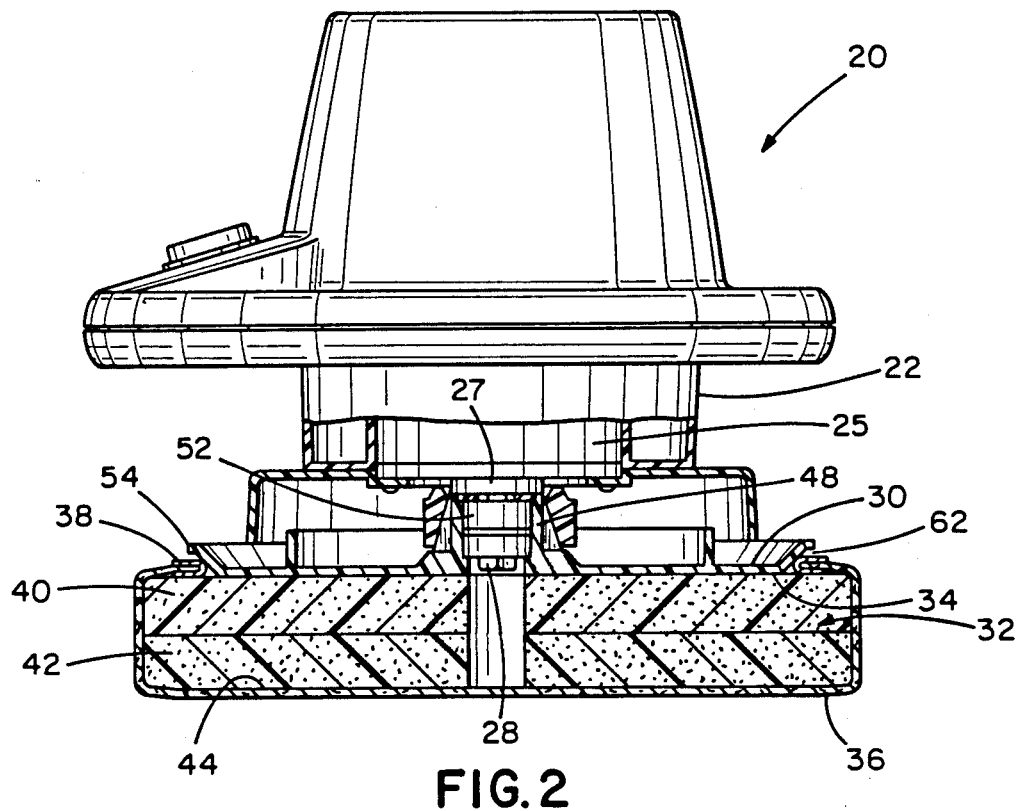
FIG. 2 is a side elevational view with certain components shown in vertical cross section of the waxer and polisher of FIG. 1 illustrating a pad, a pad holder to which the pad is adhered, and a cloth bonnet applied over the pad.

Referring to FIG. 2, the waxer and polisher 20 also includes a pad 32 of sponge-like material positioned against a lower surface 34 of the pad holder 30 and a bonnet 36 of cloth material held about the pad. For this purpose, the bonnet has sewn about its periphery a band 38 including elastic members so that the band can be extended to receive the pad, which has a larger diameter than the pad holder, and upon release, the band contracts to hold the bonnet on the pad. The pad 32 is preferably of stratified construction having an upper layer 40 of open cell foamed plastic, an intermediate layer 42 of open cell foamed plastic, and a sheet 44 of a substantially impermeable plastic underlaying the intermediate layer 42. The intermediate layer is somewhat softer than the stiffer upper layer 40 which serves to assist in retaining the circular shape of the pad, while the sheet 44 functions to prevent the intermediate layer from becoming impregnated with wax or polish which has saturated the bottom of the bonnet.

Figure 3:
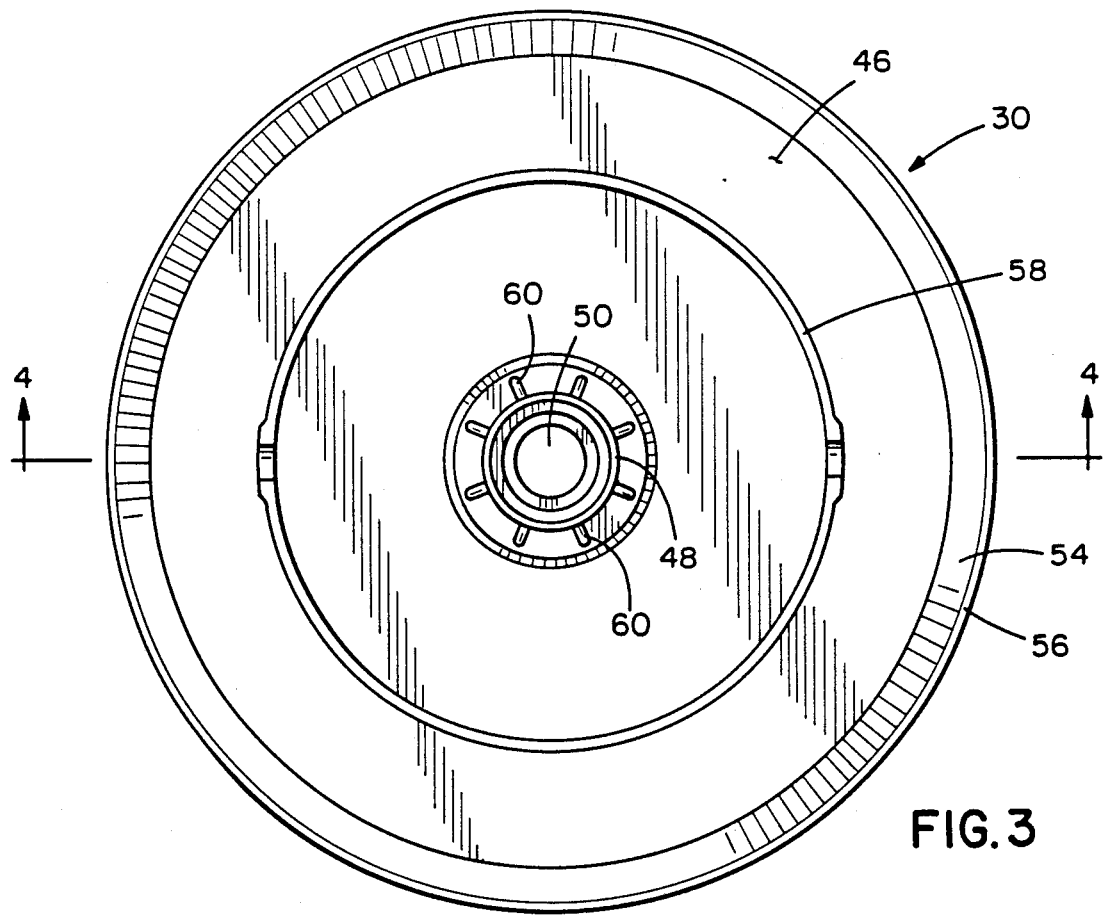
FIG. 3 is a plan view of the pad holder of FIG. 2.
Figure 4:
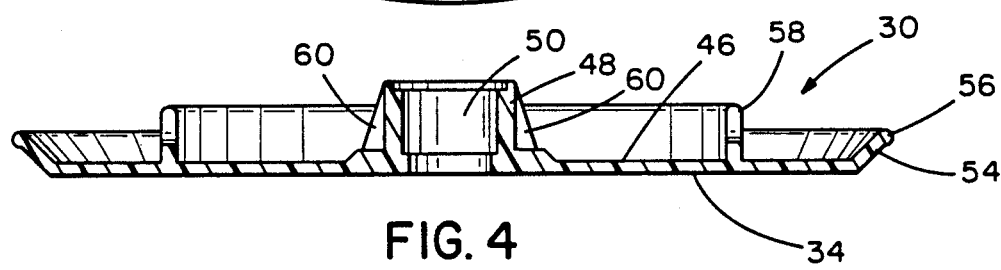
FIG. 4 is a cross-sectional view of the pad holder.

The generally disk-shaped pad holder 30 is best shown in FIGS. 3 and 4, and includes a relatively flat upper surface 46 for facing the housing 22, the relatively flat lower surface 34 for facing away from the housing, and a hub 48. The hub has a bore 50 preferably holding a roller bearing 52 (as shown in FIG. 2) which receives the shaft of the bolt 28 so that the pad holder is connected for being driven by the motor 25 operating shaft through the counterweight 27. The pad holder 30 is relatively rigid and is preferably formed of glass filled acrylonitrile-butadiene-styrene (ABS) plastic.

The pad holder has a peripheral annular lip 54 extending from the upper surface 46 toward the housing 22 and radially outwardly. This lip, which terminates in a bulbous distal end 56 preferably extends at an angle of 30 to 60 degrees with respect to the plane of the upper surface 46, and more preferably at an angle of about 45 degrees with respect to that surface. The holder also includes an inner, annular rib 58 extending upwardly from the upper surface 46. Furthermore, the holder includes a plurality of regularly spaced radial fillets 60 interconnecting the hub and the upper surface. The peripheral lip 54, along with the inner rib 58 and the fillets serve to reinforce and stiffen the pad holder.

Figure 5:
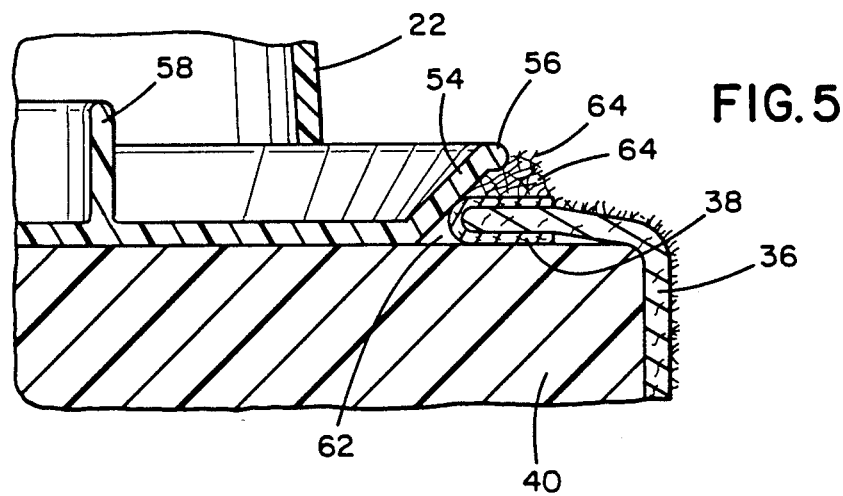
FIG. 5 is an enlarged view of portion of the pad holder, pad and bonnet showing unraveled material from the bonnet captured in a cavity formed by an angled peripheral lip on the pad holder.

As shown in FIG. 2, the lip 54 and the upper surface of the relatively stiff upper layer 40 of the pad define an annular open-mouth cavity 62. This cavity receives the band 38 of an installed bonnet 36 with the outer surface of the lip 54 functioning as an abutment to positively locate the band to limit shifting of the bonnet on the pad due to the vibrational and other forces imposed during operation and use of the waxer/polisher 20. After using a bonnet for a while, one or more portions of the bonnet 36 can become frayed and the material unravel, resulting in the threads of which the bonnet material is formed becoming free. The cavity 62, as shown in FIG. 5, serves to catch and retain such loose threads 64 or strips of cloth. Thus, the presence of the cavity 62 prevents loose threads from working their way over the top surface of the holder where they could become entwined with the bolt 28, the operating shaft of the motor or any other component connecting the pad holder to the motor.

Operation of the waxer and polisher 20 of the present invention is as follows. After a bonnet is installed about the pad 32 by stretching the band 38 and allowing the band to contract so that the bonnet encompasses the pad 32, the band is placed in the cavity 62 defined by the lip 54 and the top surface of the upper foam layer 40 of the pad. After wax is applied to the bottom of the bonnet, the object, such as an automobile, is waxed. After this waxing step is completed, the first bonnet saturated with the wax is removed from the pad by extending the band and pulling the bonnet from the pad. Thereafter a fresh bonnet 36 is applied as indicated above and used to polish the dried wax to a luster. With continued use, one of the bonnets may become frayed resulting in the presence of loose threads. These threads tend to be captured in the cavity 62 to prevent their working their way over the pad holder and becoming entwined with the components interconnecting the pad holder and the motor. Thus, the presence of the cavity, besides locating the bonnet and resisting its shifting during use, prevents a large number of the loose threads from wrapping around the rotating drive components. Thus, the requirement for the operator to disassemble the components and cut or otherwise strip away threads wrapped around the shaft or bolt, is greatly reduced if not altogether precluded. Accordingly, the life of the motor as well as the waxer and polisher in general is extended due to the provision of the annular peripheral lip 54 on the pad holder 30.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for use in applying wax to an object and/or polishing the waxed object, said apparatus comprising:
   a housing, an electric motor disposed within said housing, and an operating shaft, driven by said motor;
   a generally disk-shaped pad holder having a hub connected to said shaft, said holder having a first surface facing said housing and a second surface disposed away from said housing;
   a pad of sponge-like material carried by said holder and positioned against said holder second surface;
   a bonnet of cloth material disposed about said pad and having means adjacent its periphery for holding said pad to retain said bonnet installed about said pad, said holder including an annular lip disposed adjacent the periphery of said holder, said lip extending toward said housing and radially outwardly, the bonnet in its installed condition engaging said lip to locate said bonnet and limit its inward movement, said pad extending radially outwardly of said holder, said pad and said lip defining an annular cavity for receiving the means for holding of said bonnet.

2. Apparatus as set forth in claim 1 wherein said lip extends closer to said housing than does the installed bonnet so that threads resulting from fraying and unraveling of the material of said bonnet become trapped in said cavity to prevent them from becoming entangled with said shaft.

3. Apparatus as set forth in claim 1 wherein the distal end of said lip is bulbous.

4. Apparatus as set forth in claim 1 wherein said holder further comprises an inner annular strengthening rib extending from said first surface toward said housing.

5. Apparatus as set forth in claim 1 wherein said pad holder is made of glass filed acrylonitrile-butadiene-styrene (ABS).

6. Apparatus as set forth in claim 1 wherein said first surface is generally planar and said lip extends with respect to the plane of said first surface of an angle of between 30 degrees and 60 degrees.

7. Apparatus as set forth in claim 6 wherein said lip extends from said plane at about 45 degrees.

8. Apparatus for use in applying wax to an object and/or polishing the waxed object, said apparatus comprising:

a housing, an electric motor disposed within said housing, and an operating shaft, driven by said motor;

a generally disk-shaped pad holder having a hub connected to said shaft, said holder having a first surface facing said housing and a second surface disposed away from said housing;

a pad of sponge-like material carried by said holder and positioned against said holder second surface;

a bonnet of cloth material disposed about said pad and having means adjacent its periphery for holding said pad to retain said bonnet installed about said pad, said holder including an annular lip disposed adjacent the periphery of said holder, said lip extending toward said housing and radially outwardly, the bonnet in its installed condition engaging said lip to locate said bonnet and limit its inward movement, said pad extending radially outwardly of said holder, said holder terminating in said lip so that said bonnet does not encompass any portion of said holder.

9. Apparatus for use in applying wax to an object and/or polishing the waxed object, said apparatus comprising:

a housing, an electric motor disposed within said housing, and an operating shaft driven by said motor;

a generally disk-shaped pad holder formed of a relatively stiff thermoplastic material and having a hub connected to said shaft, said holder having a first surface facing said housing and a second surface facing away from said housing;

a pad of relatively soft sponge-like material adhered to said holder second surface and extending radially beyond said holder, said holder terminating radially outwardly in an annular lip extending from said first surface toward said housing and radially outwardly, said pad and lip defining an annular cavity; and a bonnet of cloth material disposed about said pad and having holding means adjacent its periphery for retaining said bonnet in an installed condition, said holding means being received in said cavity, at least one portion of said bonnet being frayed, threads resulting from unraveling of the bonnet material being also received in said cavity.

* * * * *